(12) United States Patent
Tahir et al.

(10) Patent No.: US 9,077,489 B2
(45) Date of Patent: Jul. 7, 2015

(54) ADJUSTING MULTI-CARRIER MODULATION AND TRANSMISSION POWER PROPERTIES

(71) Applicant: QUALCOMM Incorporated, San Diego, CA (US)

(72) Inventors: Ehab Tahir, Ontario (CA); Son Binh Cam, Ontario (CA); Richard David Roze, Ontario (CA); Joubin Karimi, Ontario (CA); Brian James Langlais, Ontario (CA); John Fraser Chappel, Ontario (CA); Syed Hussain, Cupertino, CA (US); Manjunath Krishnam, Gainesville, FL (US); Gregory Magin, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 13/798,602

(22) Filed: Mar. 13, 2013

(65) Prior Publication Data

US 2014/0269873 A1 Sep. 18, 2014

(51) Int. Cl.
*H04L 1/00* (2006.01)
*H04B 3/54* (2006.01)
*H04L 5/00* (2006.01)

(52) U.S. Cl.
CPC ............ *H04L 1/0026* (2013.01); *H04L 5/0046* (2013.01); *H04L 5/0053* (2013.01); *H04L 5/0094* (2013.01); *H04B 3/544* (2013.01)

(58) Field of Classification Search
USPC .......... 375/227, 254, 260, 264, 267, 220, 364
See application file for complete search history.

(56) References Cited

U.S. PATENT DOCUMENTS

| 2006/0218269 | A1 | 9/2006 | Iwamura | |
|---|---|---|---|---|
| 2008/0298382 | A1 | 12/2008 | Galli et al. | |
| 2010/0271972 | A1* | 10/2010 | Fujii et al. | 370/252 |
| 2011/0164514 | A1 | 7/2011 | Afkhamie et al. | |
| 2012/0140804 | A1* | 6/2012 | Corral | 375/224 |
| 2012/0284520 | A1 | 11/2012 | Newman et al. | |
| 2013/0010844 | A1 | 1/2013 | Amini et al. | |
| 2013/0215885 | A1* | 8/2013 | Vijayasankar et al. | 370/389 |

FOREIGN PATENT DOCUMENTS

WO 2014164718 10/2014

OTHER PUBLICATIONS

ERDF, "PLC G3 Physical Layer Specification," Document created Oct. 8, 2009, pp. 1-46.

(Continued)

*Primary Examiner* — Kabir A Timory
(74) *Attorney, Agent, or Firm* — DeLizio Law, PLLC

(57) ABSTRACT

A tone map includes physical layer transmission properties for a multi-carrier communications channel. The physical layer transmission properties indicate modulation mode and transmission power to be used on one or more frequencies (i.e. "tones"). The transmission power may be reduced on a first frequency having a high signal-to-noise ratio (SNR) so that performance will improve for a second frequency having a lower SNR. Transmission power may be reduced on a first frequency having an unusably low SNR so that performance will improve on a second frequency. A tone map message is used to efficiently communicate modulation and transmission power adjustments on a per-carrier basis.

23 Claims, 9 Drawing Sheets

(56) References Cited

OTHER PUBLICATIONS

HomePlug Alliance, "HomePlug Green PHY 1.1, The Standard for In-Home Smart Grid Powerline Communications: An application and technology overview," Version 1.02, Oct. 3, 2012, pp. 1-17.
Yonge, et al., "An overview of the HomePlug AV2 technology," Research Article, Journal of Electrical and Computer Engineering, 2012, pp. 1-18.
"Narrow-band OFDM power line communication transceivers—G3-PLC; G.9903 (Oct. 2012)", ITU-T Standard, International Telecommunication Union, Geneva; CH,No. G.9903 (Oct. 2012), XP017578460, Oct. 29, 2012, pp. 1-186.
"PCT Application No. PCT/US2014/023297 International Search Report and Written Opinion", Aug. 19, 2014, 11 pages.
Tunc, et al., "Reduced complexity LPTV-aware bit loading for channel adaptation in broadband PLC", Power Line Communications and Its Applications (ISPLC). 2012 16th IEEEinternational Symposium On, IEEE, XP032181520, Mar. 27, 2012, pp. 206-211.
"PCT Application No. PCT/US2014/023297", Written Opinion of the International Preliminary Examining Authority, dated Feb. 26, 2015, 7 pages.

\* cited by examiner

ADJUSTING MULTI-CARRIER MODULATION AND TRANSMISSION POWER PROPERTIES

BACKGROUND

Embodiments of the inventive subject matter generally relate to the field of network transmissions, and, more particularly, to adjusting carrier modulation and carrier transmission power in multi-carrier transmissions.

Communication technology is evolving to allow for better channel estimation and adaptation of transmissions over a communication channel. For example, in many technologies, such as powerline communications, a medium between a first device and a second device may support multi-carrier transmissions. Other medium and technologies may also use multi-carrier transmissions in which multiple frequencies are used over a communication channel. Indicators that may be used as a measurement of the quality of a transmission via a signal (e.g. via a frequency) include the signal-to-noise ratio (SNR) or signal-to-interference-plus-noise (SINR).

The formula for SINR may be defined as $P/(I+N)$ where P represents the received power, I represents the interference power of other simultaneous transmissions, and N represents the noise (such as background or intermittent noise). Often, "noise" will be defined to include interference as well as background noise or intermittent noise. Therefore, when measuring signal to noise ratio, the measurement may be referred to as SNR or SINR interchangeably in some systems.

SNR is used as a measurement of the quality of a transmission via a signal because it correlates closely with a receiver's ability to interpret the transmitted signal. In traditional systems, SNR may also correlate with a power level of a transmitted signal. When a power level of a transmitted signal is high the SNR high, and conversely when a power level of a transmitted signal is low the SNR is low.

SUMMARY

Various embodiments are disclosed which include defining physical layer transmission properties for particular frequencies of a multi-carrier communications channel, the physical layer transmission properties including both modulation and power level information. In this disclosure, the physical layer transmission properties may be included in a tone map message.

In one embodiment, a tone map is prepared at a first device for a communications channel between the first device and the second device, the tone map including physical layer transmission properties for each of a plurality of frequencies including at least a first frequency, wherein the physical layer transmission properties include modulation information and transmission power information for at least the first frequency. The tone map is transmitted to the second device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
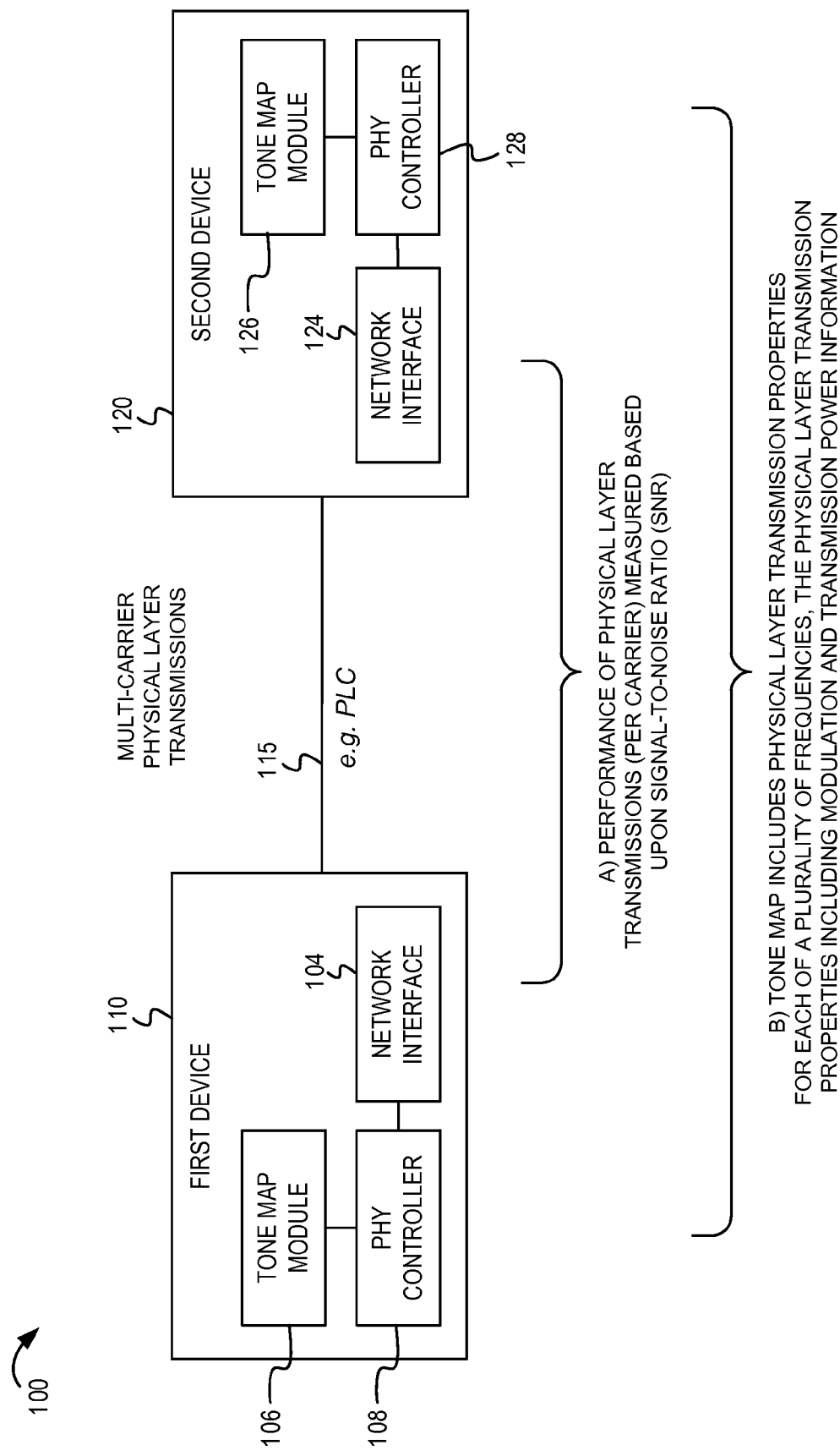
FIG. 1 is an example system diagram illustrating a communications network used in various example embodiments of this disclosure.

The description that follows includes exemplary systems, methods, techniques, instruction sequences and computer program products that embody techniques of the present inventive subject matter. However, it is understood that the described embodiments may be practiced without these specific details. For instance, although examples refer to example values included in a tone map, other values may be included in other messages to communicate physical layer transmission properties for both modulation and power level adjustments. In other instances, well-known instruction instances, protocols, structures and techniques have not been shown in detail in order not to obfuscate the description.

Various embodiments are disclosed which include defining physical layer transmission properties for a multi-carrier communications channel. Physical layer transmission properties to be used on one or more frequencies (i.e. "tones") are included in a tone map message Traditional tone maps may not allow for granular control of transmission power for selected frequencies of the tone map. As described below, traditional tone maps are constructed to convey modulation mode without regard to transmission powers of particular frequencies. In this disclosure, a tone map includes physical layer transmission properties that indicate modulation mode and transmission power for particular frequencies. In one embodiment, the physical layer transmission properties may be selected to reduce transmission power on a first frequency having a high signal-to-noise ratio (SNR) so that performance will improve for a second frequency having a lower SNR. In another embodiment, transmission power may be reduced on a first frequency having an unusably low SNR so that performance will improve on a second frequency.

In accordance with this disclosure, a device may determine physical layer transmission properties (such as transmission power) for particular frequencies based upon SNR measurements associated with the particular frequencies. A tone map may be used to convey modulation rate and transmission power for each of a plurality of frequencies used in a communications channel. In an embodiment, the physical layer transmission properties are conveyed using a modified tone map without adding additional overhead.

In this disclosure, examples are provided based upon powerline communication technology. It should be understood that the techniques herein may apply to other technologies that use multi-carrier transmissions over a communications channel between a first device and a second device. Although examples in this disclosure refer to tone maps and powerline communications, the scope of this disclosure should not be limited as such. Rather, the use of this disclosure may be used with adjusting a variety of physical layer transmission properties in a variety of communication technologies. The terms channel estimation, channel adaptation information, tone map, etc., while common terminology to persons of skill in the art of powerline communication technology, may have analogous terms of similar meaning in other communications technologies.

FIG. 1 shows a system 100 illustrating an example network configuration used in various example embodiments of this disclosure. The system includes a first device 110 and a second device 120 communicatively coupled via a network 115. The first device and second device may also be referred to as nodes or stations. In the example system 100, network 115 may be a powerline communications (PLC) network connection between the first device 110 and the second device 120.

It should be understood that the network 115 may include one or more different types of network. For example, the network 115 may include a local area network (LAN), such as a company intranet or a home network. In some implementations, the network 115 may include a metropolitan area network (MAN) or a wide area network (WAN) such as the Internet. In other implementations, the network 115 may include a combination of one or more different types of network. For example, a LAN such as the home network may be connected to an external access network. In such cases, one or more gateway devices may act as interfaces between two different networks.

In some implementations, the network 115 comprises one or more network devices connected to a shared medium such as a phone line network or a coaxial cable network. The one or more network devices may be connected via one or more gateway devices to an external network such as the Internet. The gateway device may be connected by any type and form of connection to the external network including a broadband connection or a dialup connection. The gateway device may be connected via one or more bridges to other home network segments. The home network segments may be based on a home networking technology such as one based on powerline networks.

The network 115 can be of any type and form and may include any of the following: a point to point network, a broadcast network, a computer network, a powerline network, an Asynchronous Transfer Mode (ATM) network, a Synchronous Optical Network (SONET), a Synchronous Digital Hierarchy (SDH) network, a wireless network and a wired network. If the network 115 is at least in part a wireless network, the network 115 may include one or more of the following: coaxial cable, powerline wires, twisted pair wires or any other form and type of wire. The topology of the network 115 may be a bus, star or a ring topology or any other topology capable of supporting the operations described herein.

In some implementations, the network 115 may be a Broadband Powerline Network (BPLN) that provides access to a backhaul network. A BPLN can be managed by a service provider entity having access to the underlying physical powerline medium. A BPLN is a general purpose network that can be used for several types of applications including, smart grid management, broadband internet access, voice and video delivery services, etc. In various implementations, a BPLN can be deployed on low voltage, medium voltage and high voltage powerlines. Additionally, a BPLN can span an entire neighborhood or it may be deployed within a single multi-dwelling unit. For example, it can be used to provide network service to tenants in a single apartment building. While powerlines are one medium for deploying the BPLN, similar techniques can be deployed on other wire lines, such as, for example, coaxial cables, twisted pair or a combination thereof.

In some implementations, the first and second devices 110, 120 may be nodes of a home network (HN) communicating with each other using a home networking technology. The first and second devices 110, 120 may communicate with each other using any of a variety of communication protocols. In one implementation, each node in the network may communicate as a communication "station" using a physical (PHY) layer protocol that is used by the nodes to send transmissions to any other stations that are close enough to successfully receive the transmissions. In FIG. 1, the first device 110 includes a network interface 104 for coupling the first device 110 to the network 115. The first device 110 also includes a PHY controller 108 and a tone map module 106. The PHY controller 108 operates in coordination with the tone map module 106 to configure the physical layer transmission properties to be used by the network interface 104. Similarly the second device 120 also includes a network interface 124, PHY controller 128, and tone map module 126 having corresponding functionality and protocols as those same units in the first device 110.

Some implementations of the PHY layer use OFDM modulation. In OFDM modulation, data is transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$, referred to as the OFDM bandwidth.

Having described the structural features of FIG. 1, various embodiments described in this disclosure may be described with relation to operations performed by the structural features of FIG. 1. It should be restated that the features of FIG. 1 are provided as an example and without limitation to the scope of the various described embodiments. Furthermore, some or all of the operations described may be performed independently or not at all in some implementations.

Referring to FIG. 1, the network 115 comprises a communications channel between the first device 110 and the second device 120. In this example, the network 115 includes the use of orthogonal frequency division multiplexing (OFDM) over the same communication medium. A communications channel between any two devices may have different amplitude and phase response. Therefore, adapting the transmission properties for each carrier may result in a higher data rate. Some carriers may be deselected (e.g. masked) for use on the communications channel, while other carriers may utilize higher or lower modulation and data rates depending on the quality associated with each carrier. By turning off impaired frequencies, the bit error rates may be decreased on neighboring frequencies. On the remaining frequencies, selections regarding modulation, coding rate, and error correction for each carrier may result in a highly optimized link throughput. Channel quality is estimated at regular intervals for each carrier and physical layer transmission properties (e.g. included in a tone map) indicate which carriers are used to transmit data, as well as the type of modulation and error correction coding to be used.

For example, HomePlug® AV uses a tone map to support "adaptive bit loading." Adaptive bit loading is another way to describe that each carrier may be modulated differently in order to achieve the highest possible data rate that can be supported by the communication channel. A carrier with low quality received signal might support Binary Phase Shift Keying (BPSK), which provides 2-bits per carrier per symbol. At the other extreme, a carrier with very high quality received could support 1024 QAM, which provides 10-bits per carrier per symbol. Adaptive bit loading enables every carrier in the OFDM signal to carry as much data as possible for the given line conditions. However, adaptive bit loading may require the signal strength of every carrier at the receiver to be known by the transmitter prior to sending a packet. As a result, HomePlug AV devices within the same network periodically exchange sounding packets to maintain up-to-date knowledge of channel conditions in the form of tone maps.

Typically a channel estimation process is used to determine the quality associated with each carrier (i.e. frequency) over the communications channel. In an example channel estimation process, the first device 110 sends a signal that can be detected and measured by the second device 120. The second device 120 analyzes the quality characteristics of the received signal to determine communications properties for each carrier. For example, the PHY controller 128 may perform SNR measurements. Upon completion of channel estimation processes, the second device 120 may prepare and send physical layer transmission properties (which may also be referred to as "channel adaptation information") in the form of a tone map back to the first device 110. For example, the tone map module 126 may prepare a tone map message constructed in accordance with a physical layer protocol and send the tone map message such that the tone map module 106 of the first device 110 can interpret the tone map message. Physical layer transmission properties may include settings for modulation, transmission power, carrier usage, forward error control, guard interval spacing, frequency or time division multiplexing, etc. The second device 120 may update a tone map at any time by sending a new tone map to the first device 110.

A traditional tone map is based upon overall channel quality and throughput capability for particular frequencies. For example, the channel quality estimation process may be used to determine the maximum transmission rate possible for each frequency of a communication channel. A traditional tone map includes transmission properties (e.g. modulation, coding rate, error correction, etc.) for one or more carriers used in the communications channel. Accordingly, the tone map typically includes the channel adaptation information defining transmission properties for each carrier. The tone map is communicated from the receiving device to the transmitting device. In some variations, a receiving device may generate multiple tone maps to be used at different periods of time in the time domain of the communication channel. For example a first tone map may be assigned for a downward portion of a power cycle, and a second tone map may be used during the peak portion of the power cycle. The different tone maps may be provided by the receiving device to instruct the transmitting device which physical layer transmission properties to use during each period of the power cycle. Typically, the tone map is assigned to provide the highest modulation rate possible for each carrier of the communications channel. A full tone map may include physical layer transmission properties for each carrier. In some example systems, communicating a full tone map may add a relatively large amount of overhead bandwidth due to the amount of information provided for each carrier. For example, there are 1155 carriers in the HomePlug AV signal. (The HomePlug AV occupied spectrum extends from approximately 1.8 MHz to 30 MHz and is divided into 1155 separately modulated carriers (tones) but not all frequency carriers are used.)

In accordance with an embodiment of this disclosure, a device may detect SNR associated with a frequency and convey a transmission power adjustment for the frequency based upon the SNR. There may be scenarios where performance (overall system throughput) can be improved by adjusting the transmission power level and modulation mode on a carrier by carrier basis. In communication systems, the ability to achieve optimal performance is affected by practical hardware limitations. For example, power gain amplifiers used to amplify transmit and receive signals can introduce distortion as the amount of gain amplification is increased. Additionally, the dynamic range of a transmitter and a receiver is limited by the resolution of the Digital-to-Analog and Analog-to-Digital converters. Regulatory requirements may limit the dynamic range by setting maximum radiated emissions. Therefore, some frequencies may be transmitted with significantly less power than others. Therefore, SNR may be different for each frequency used in a multi-frequency communications channel.

In an example embodiment, at bracket A, the performance of each carrier may be measured based upon SNR of measured signals. At bracket B, the tone map sent from second device 120 to the first device 110 includes physical layer transmission properties for each of a plurality of carriers (frequencies). The physical layer transmission properties include modulation and transmission power information. In some implementations, a unique value in the tone map may be used to convey both the modulation information and the transmission power information.

By adjusting power levels on a carrier by carrier basis using a tone map message, overall system throughput can be improved. The possible power adjustments may be determined by the receiver by analyzing per carrier SNR values and received power levels. The per-carrier SNR values may be analyzed to determine transmission power adjustments that are communicated to the transmitting device in the form of a new tone map. Alternatively, the SNR information, or information derived from it, may be shared with the transmitting device in order to achieve an optimal balance of tone-by-tone modulation modes and power levels.

In some implementations, transmission power levels may be reduced on particular frequencies without impacting throughput for those particular frequencies. For example, for carriers which already have a high SNR, the signal strength may already be sufficient for the modulation used on that carrier. Therefore, reducing transmission power for that carrier may not cause a decrease in performance for that carrier. Meanwhile, performance on adjacent carrier may improve as a result of decreasing transmission power for the carrier with already high SNR.

In some example scenarios, certain frequencies may have excess SNR than required to support the symbol modulation rate for the frequency. For example, the communication channel may be capable of convey data using a lower transmission power even though the resulting SNR may be lower. Reducing the transmission power on a first tone may still allow for successful transmission of data via the first tone, but may have a positive effect of increased SNR on one or more other tones.

In some systems, a high SNR may result in the selection of a higher modulation rate, up to a maximum bit rate. However, a carrier may already be configured to the maximum bit rate (modulation) supported by a PHY protocol while also still having high SNR. Since the bit rate may not be increased, the high SNR may be considered excessive for the carrier. By decreasing the transmission power level, the SNR may be reduced and overall performance of the communications channel improved.

The increased SNR on the other tones may improve due to the reduction in distortion introduced by a Transmit Amplifier as the transmit signal power of the first tone is reduced. Quantization noise effects at the transmitter in the Digital-to-Analog converter and at the receiver in the Analog-to-Digital converter as the overall dynamic range may also be reduced (allowing more discrete levels being available for the lower SNR signals). Therefore, it may be desirable to reduce transmission power for a frequency if the reduced transmission power results in an SNR that is still sufficient to convey data using a particular modulation rate for the frequency.

In other example scenarios, certain frequencies may have very low SNR due to external noise sources (meaning little or no data can be reliably transmitted on those frequencies). In these scenarios, the power on the very poor tones can be reduced (or eliminated) to improve the SNRs on other tones. The SNRs on the other tones may improve as a result of decreased distortion (as described above) or by increasing power on other tones where the impairment is attenuation, not noise.

Typically SNR is detected at a receiving device. In traditional systems, the adjustment to transmission power may be made by a transmitting device based on SNR feedback or other quality metrics provided by the receiving device. In accordance with at least one embodiment of this disclosure, the transmission power adjustments may be included in a tone map message specifying per-carrier modulation properties.

Figure 2:
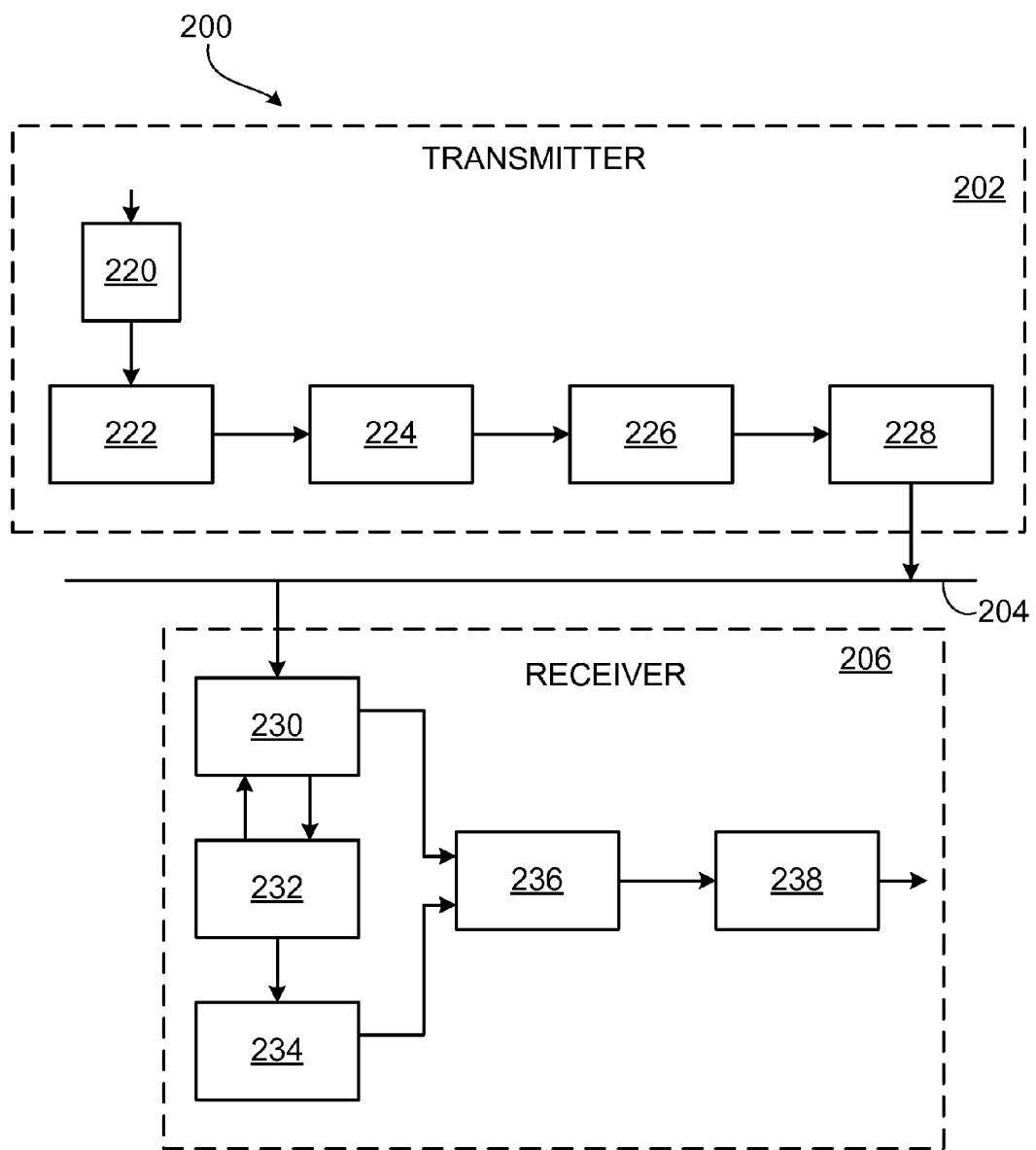
FIG. 2 is a block diagram of a communication system for communicating over the network.

FIG. 2 is a block diagram of a communication system 200 that includes a transmitter 202 for transmitting a signal (e.g., a sequence of OFDM symbols) over a communication medium 204 to a receiver 206. The transmitter 202 and receiver 206 can both be incorporated into a network interface module at each device (e.g., first and second devices 110, 120). The communication medium 204 can represent a path from one device to another over the powerline network.

At the transmitter 202, modules implementing the PHY layer receive an MAC layer protocol data unit (MPDU) from the MAC layer. The MPDU is sent to an encoder module 220 to perform processing such as scrambling, error correction coding and interleaving. The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 may also determine which of the carrier frequencies $f_1, \ldots, f_N$ within the OFDM bandwidth are used by the system 200 to transmit information. For example, some carriers that are experiencing fades can be avoided, and no information is transmitted on those carriers. For some carriers (e.g., a carrier i=10) that correspond to restricted bands (e.g., an amateur radio band) on a medium 204 that may radiate power, no energy may be transmitted on those carriers (e.g., $A_{10}=0$). The mapping module 222 may also determine the type of modulation to be used on each of the carriers (or "tones") according to the tone map. The tone map can be a default tone map, or a customized tone map determined by the receiving station, as described in more detail below. The power level with which signals are transmitted on the communication medium 204 may be associated with power level adjustments (e.g. gain or reduction) that may also be included in the tone map.

An inverse discrete Fourier transform (IDFT) module 224 may perform the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform.

A post-processing module 226 may combine a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 may extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 may be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer may receive a signal from the communication medium 204 and generate an MPDU for the MAC layer. An AFE module 230 may operate in conjunction with an Automatic Gain Control (AGC) module 232 and a time synchronization module 234 to provide sampled signal data and timing information to a discrete Fourier transform (DFT) module 236. It should be understood that the receiver 206 also may be aware of the tone map used for generating and transmitting the signal. Therefore, the AGC module 232 may also be configured to take into account power level adjustments that were included as part of the tone map.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Home networking systems commonly use the phone lines, powerlines or coaxial cables inside the house as a communication medium. In some cases, there could be variation in signal attenuation and noise characteristics between various pairs of nodes. In such cases, home network systems may use channel adaptation procedures that enable selection of unique physical layer encoding parameters (e.g., modulation rate and forward error correction code rate) between a given pair of nodes. This approach enables optimization of the physical data rate that can be achieved between the pair of nodes according to current channel characteristics.

In some implementations, the channel characteristics depend on an attenuation (and distortion) of the signal as it propagates from the transmission to the receiver. In other implementations, the channel characteristics may depend on noise within the network. The combined effect of signal attenuation (and distortion) and noise may determine the physical layer data rates that may be achieved between a pair of nodes. Higher physical data rates allow for more demanding and/or data intensive applications to be supported. The channel characteristics may also determine quality of a channel or how reliably information is transmitted across the channel. Indicators and measures of quality may include, for example, bit error rate (BER) or symbol error rate (SER). In general, a low quality channel is prone to distorting the messages it conveys while a high quality channel preserves the integrity of the messages it conveys. In some implementations, the quality of the channel in use between communicating entities governs the probability of the destination correctly receiving the message from the source.

Figure 3:
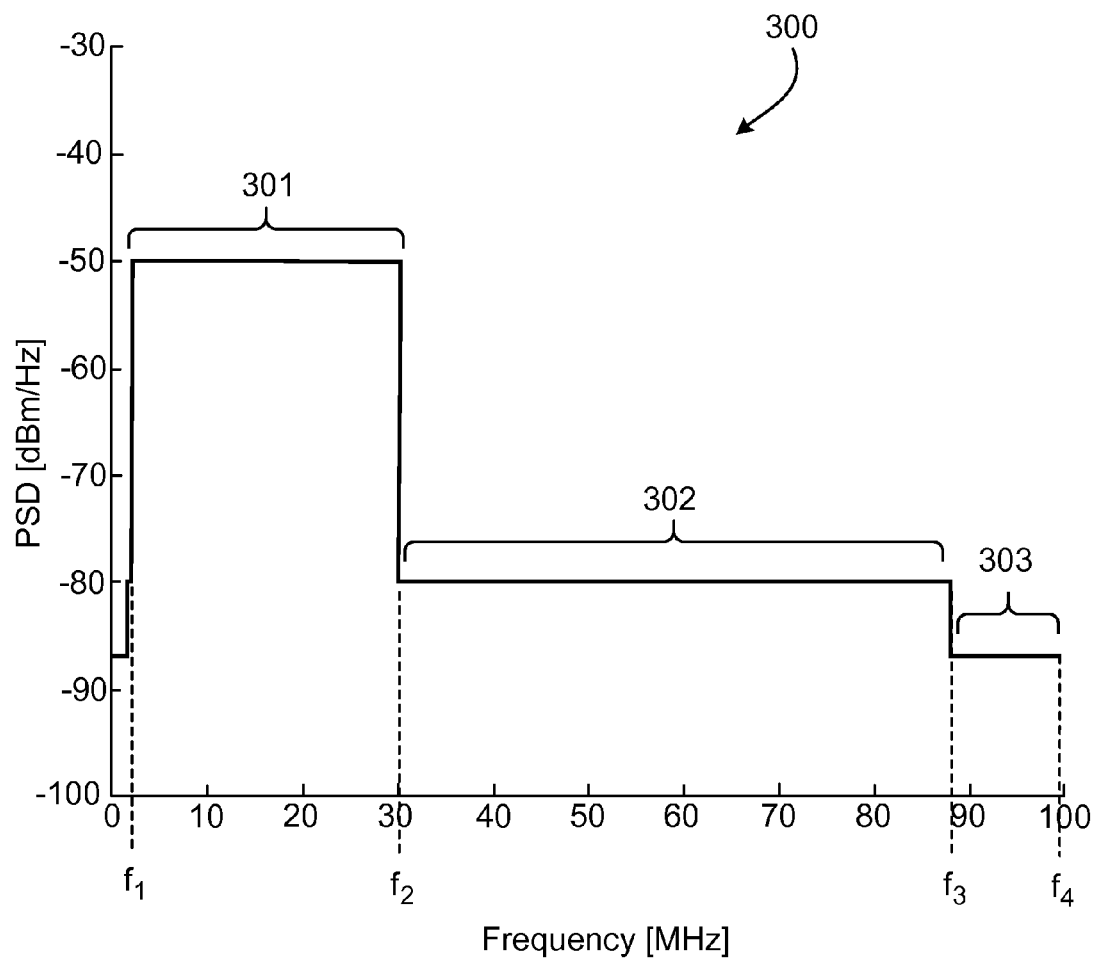
FIG. 3 is an example of a power spectrum density profile.

FIG. 3 shows an example power spectrum density (PSD) profile 300. The PSD profile 300 represents an exemplary distribution of allowable maximum transmission power for an example communication system. In the example, frequency bands include a first frequency band 301 from $f_1$-$f_2$, a second frequency band 302 from $f_2$-$f_3$, and a third frequency band 303 from $f_3$-$f_4$. In the example of FIG. 3, each frequency band is associated with a flat PSD. In other PSD profiles, the maximum power transmission may vary linearly with frequency. In general the PSD can be different at different frequencies and together define a PSD profile for a given frequency band.

For most communication systems, regulatory authorities, such as the Federal Communications Commission (FCC) in the United States, stipulate emission limits (radiated, conducted or other) that in turn impose limits on power transmitted from a device. Typically, a manufacturer of communications equipment derives a maximum allowable PSD profile from the regulatory limitations. The PSD profile 300 is an example of a profile with maximum allowable limits based upon regulatory requirements. The PSD profile 300 may represent a maximum allowable PSD for powerline communication systems, to meet the regulations for a certain frequency band (0-100 MHz, in this example) in North America. In this example, the transmission power limit is substantially equal to −50 dBm/Hz in the first frequency band 301, and substantially equal to −80 dBm/Hz in the second frequency band 302. Even though the example shows a frequency band 0-100 MHz, communication systems such as powerline communication systems can operate in other frequency bands including bands above 100 MHz.

From the PSD profiles depicted in FIG. 3, it can be seen that transmission powers used for communication between nodes of a network depend on the frequency being used for such a communication. For example, referring to the example PSD profile 300 of FIG. 3, a signal whose frequency lies in the first frequency band 301 can be transmitted with a maximum PSD of −50 dBm/Hz while a signal whose frequency is in the second frequency band 302, can be transmitted with a maximum PSD of only −80 dBm/Hz.

In general, transmitting at the maximum allowable power (or PSD) for a given frequency results in the best throughput for that frequency. However, in some implementations, it may be desirable to reduce the PSD to a level less than the maximum allowable level for that frequency. For example, consider the difference in maximum transmission power associated with frequency bands 301 and 302 of FIG. 3. If the same hardware, for example, a single digital-to-analog converter, is used in a transmitter to generate a wideband signal that spans the entire frequency range and uses the maximum allowable level in each band, then the signal in the second frequency band 302 will be represented with fewer discrete levels than the signal in the first frequency band 301. This, in turn will result in higher quantization noise and limited fidelity for the signal in the second frequency band 302. In some cases, the quantization noise may be amplified when the signal, irrespective of the amplitude, is scaled at the input of the digital to analog converter to span the entire input range of the converter. The same principle also applies at the receiving converter that converts the analog received signal into digital levels. In some implementations, the errors arising due to increased quantization noise can be mitigated by reducing the power or PSD in the first frequency band 301. Such reduction in the PSD of the first frequency band 301 results in a lower difference with the PSD of the second frequency band 302, thereby reducing the effect of the quantization noise. For example, if the PSD difference is reduced by 6 dB, the quantization noise in the second frequency band 302 is halved. In other words, depending on the communication channel between two nodes of a network, a decrease from the maximum power in one frequency band can provide a gain to fidelity in the converters for another frequency band.

Therefore, it may be desirable to reduce power on particular frequencies for a particular communication system. In accordance with this disclosure, custom PSD levels for particular frequencies may be included in a tone map message that also communicates modulation characteristics. Overhead may be reduced by utilizing an existing tone map message format in some embodiments.

Figure 4:
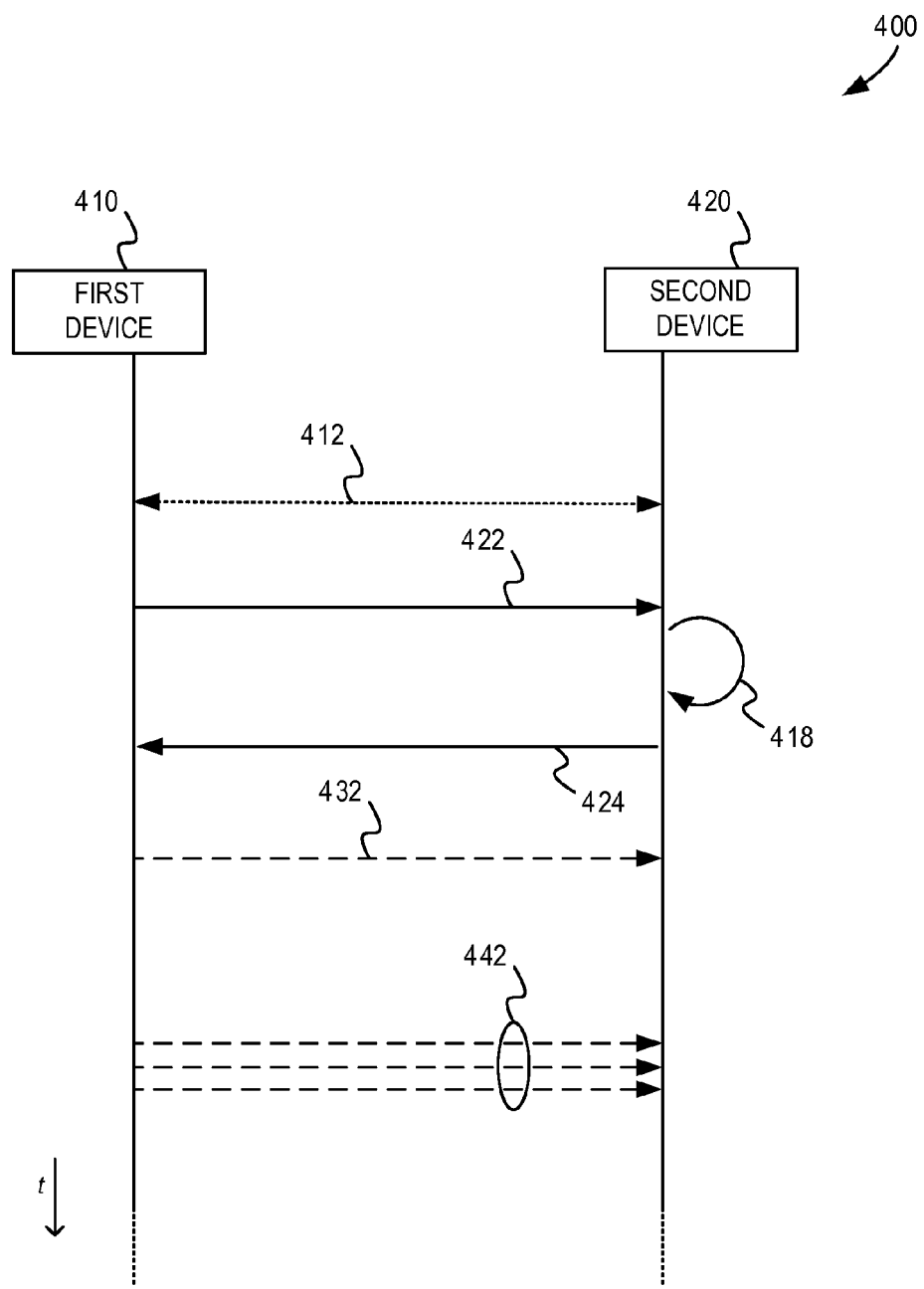
FIG. 4 is a message flow diagram depicting example operations for determining and using physical layer transmission properties.

FIG. 4 is a message flow diagram 400 depicting example operations in accordance with embodiments of this disclosure. In some implementations, such operations allow one or more of power savings at the transmitter, spectral shaping of transmitted signals and optimization of a link between a first device 410 and a second device 420 coupled via a communications channel. Operations include determining one or more frequency bands for adjusting transmission power level.

At 412, the first device 410 and second device 420 are coupled via a communications channel. At 422, the first device 410 may send a special type of training signals to the second device 420. The training signals (or SOUND packets, as they are sometimes referred to as) are sent as data packets over a specific range or band of frequencies and meet the maximum transmit PSD requirements. In some implementations, a transmitting node can have a finite set of frequency bands to choose from. In such cases, the node sends the training signals or SOUND packets at each of the frequency bands. The receivers in the network monitor these packets and gather signal to noise ratio (SNR) of the various carriers in the frequency range or band. For example, at 418, the second device 420 may measure the signals to determine SNR associated with each carrier of the communication channel.

In some implementations, the second device 420 uses this SNR information to determine various parameters such as the type of modulation to be used per carrier, the code rate to be used and the guard interval to be used by the first device 410. In addition to the modulation information, the second device 420 may also determine whether the SNR is excessive or comparatively large as compared to one or more adjacent frequencies. If the SNR is excessive or comparatively larger, the second device 420 may determine a power level reduction factor for the carrier. An SNR is considered excessive if a reduction in the SNR is possible without degrading the quality of the carrier or decreasing the modulation rate for the carrier.

For example, operations at 418 may further include adjusting the PSD for a group of frequencies used for transmission of data packets between the first device 410 and the second device 420. The group of frequencies for which the PSD is adjusted may be chosen in various ways. In some implementations, the group is chosen such that all the frequencies are in the frequency band with the highest allowable PSD. In some implementations, the group is chosen in such a way that at least some of the frequencies are in the frequency band with the highest allowable PSD while other frequencies in the group are in frequency bands with relatively lower allowable PSD.

The PSD for the group of frequencies may be adjusted in a variety of ways. In some implementations, the PSD in the frequency band with the highest allowable PSD is reduced such that the difference in PSD with other bands is reduced. For example, referring back to FIG. 3, a reduction of 20 dBm/Hz in the first frequency band 301 reduces the transmit PSD in the first frequency band 301 to −70 dBm/Hz, thereby reducing the difference in PSD with the second frequency band 302 to 10 dBm/Hz as opposed to the original difference of 30 dBm/Hz. When a same set of hardware (for example, a digital to analog converter (DAC) or an analog to digital converter (ADC) that uses a particular set of quantization levels) is used to process signals for all frequencies, such a reduction in the PSD difference between the bands 301 and 302 results in lower quantization errors for the signals transmitted in the frequency band 302. In general, there may be more than two frequency bands. Regardless of the number of frequency bands or discrete frequencies, if a same set of hardware is used for processing signals for all frequency bands or frequencies, the quantization errors will be less if the transmit PSDs are close to each other. In other words, the flatter the transmit PSD profile, the lesser will be the quantization errors. However, reducing the transmit PSD also results in lower total transmitted power thereby lowering the signal to noise ratio (SNR). Therefore, in some implementations, reducing the transmit PSD represents a tradeoff between quantization noise and other noise such as noise introduced by the channel between the transmitter and the receiver. In general, the PSD in a frequency band is reduced such that the quantization error in a band with lower allowable PSD is less than a threshold value while the overall SNR is also in an acceptable range.

The modulation information and any power level adjustments may be send collectively as a tone map which is sent (shown as arrow 424) to the first device 410 in response to receiving the training signal. At 432, the first device 410 may acknowledge the tone map and/or utilize the tone map for further transmissions from the first device 410 to the second device 420.

In an alternative embodiment, there may be other techniques to determine the best transmit power spectrum suitable for a link. In some implementations, tone maps as described above, can be used for that purpose. For example, first device 410 can transmit the training signals or SOUND packets at the various available power levels (shown as 442). In response, the first device 410 may receive various tone maps in response (not shown). From the tone maps, the first device 410 can compare the link quality for all the different power levels. The power level that yields the highest link speed can then be chosen.

Figure 5:
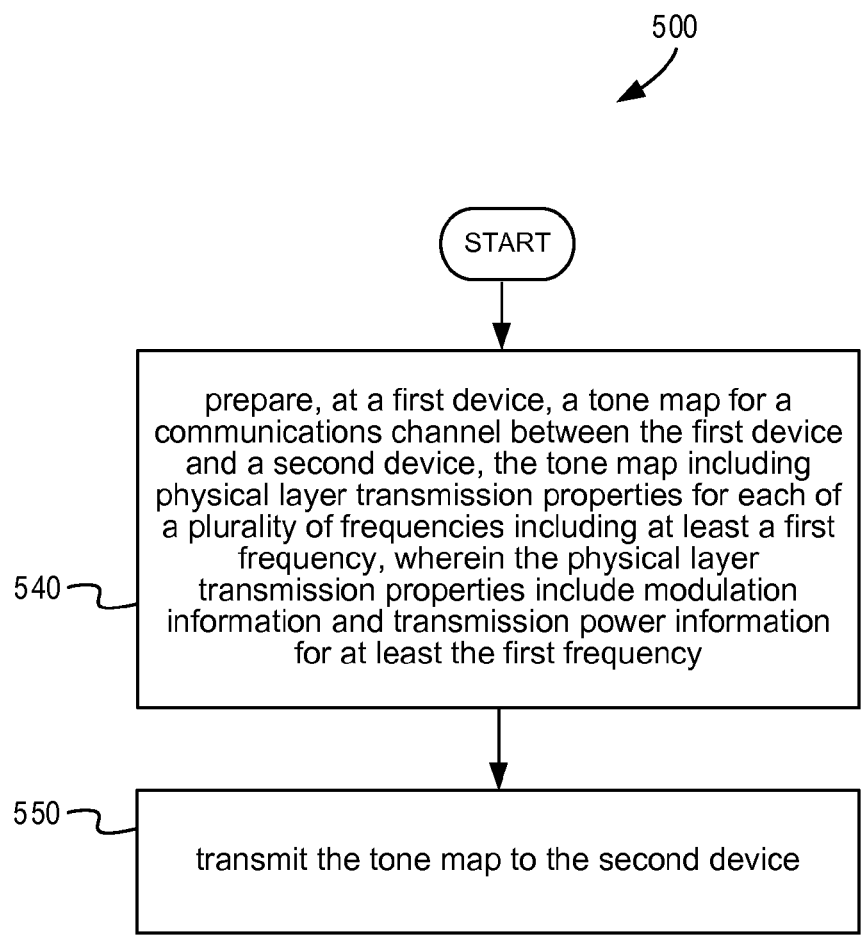
FIGS. 5 and 6 are flow diagrams illustrating example operations for determining physical layer transmission properties.

FIG. 5 is a flow diagram 500 illustrating example operations for determining physical layer transmission properties. At 540, the flow diagram includes preparing, at a first device, a tone map for a communications channel between the first device and a second device, the tone map including physical layer transmission properties for each of a plurality of frequencies including at least a first frequency, wherein the physical layer transmission properties include modulation information and transmission power information for at least the first frequency. At 550, the flow diagram includes transmitting the tone map to the second device.

Figure 6:
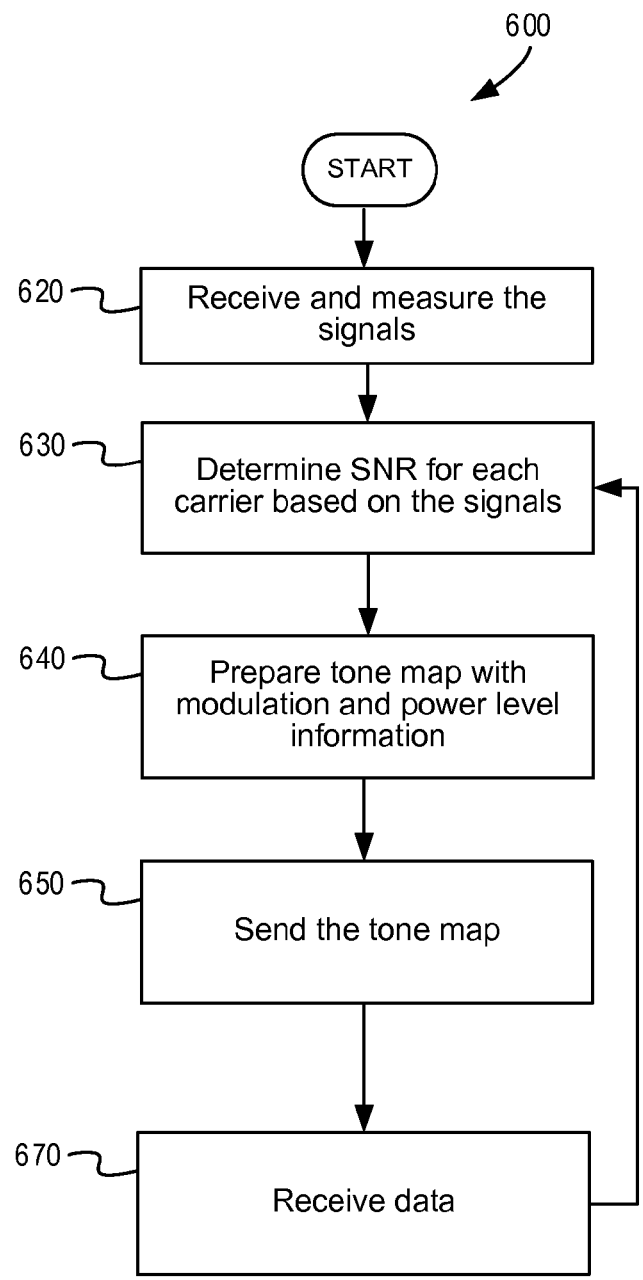

FIG. 6 is a flow diagram 600 illustrating example operations for determining physical layer transmission properties. The process begins with a channel estimation process. For example, at 620 the receiving device receives signals from a transmitting device and measures the signal strength. At 630, the receiving device determines the SNR for each carrier based on the signals. At 640, the receiving device prepares a tone map with physical layer transmission properties. The physical layer transmission properties may include modulation and power level information for one or more carriers used in the communications channel.

At 650, the receiving device sends the tone map in a tone map message to the transmitting device. Subsequently, the receiving device receives data or other signals from the transmitting device at 670. In some implementations, the receiving device may repeat the operations at 630, 640, and 650 based on subsequently received signals.

Receiving device may perform the operations of flow diagram 600 separately for each transmitting device for which signals are received. Furthermore, the tone map with modulation and power level information may be associated with a time fraction of the powerline cycle. The receiving device may prepare multiple tone maps for a particular transmitting device in accordance with these operations, such that each tone map is associated with a different time fraction of the powerline cycle.

Figure 7:
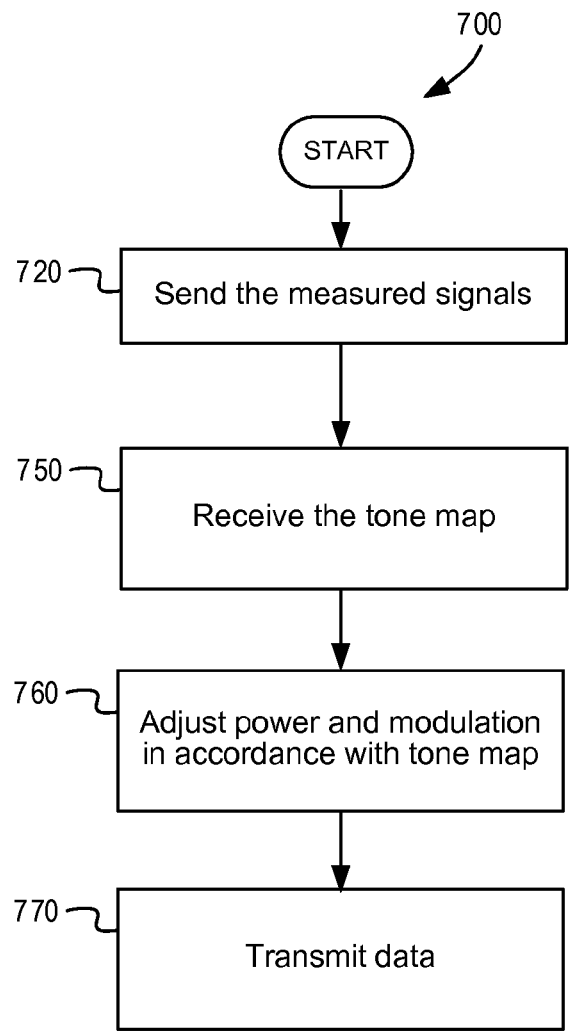
FIG. 7 is a flow diagram illustrating example operations at a transmitting device to process a tone map for which physical layer transmission properties are configured.

FIG. 7 is a flow diagram 700 illustrating example operations at a transmitting device. At 720, the transmitting device participates in the channel estimation process by sending signals to be measured by the receiving device. The signals may comprise pilot or reference signals sent according to a physical layer protocol. At 750, the transmitting device receives a tone map from the receiving device in response to the pilot or reference signals. The tone map includes physical layer transmission properties for each of a plurality of carriers used in the communications channel. At 760, the transmitting device adjusts power and modulation of each carrier in accordance with the tone map. At 770, the transmitting device transmits further messages, data, or signals using the adjusted power and modulation properties.

Figure 8:
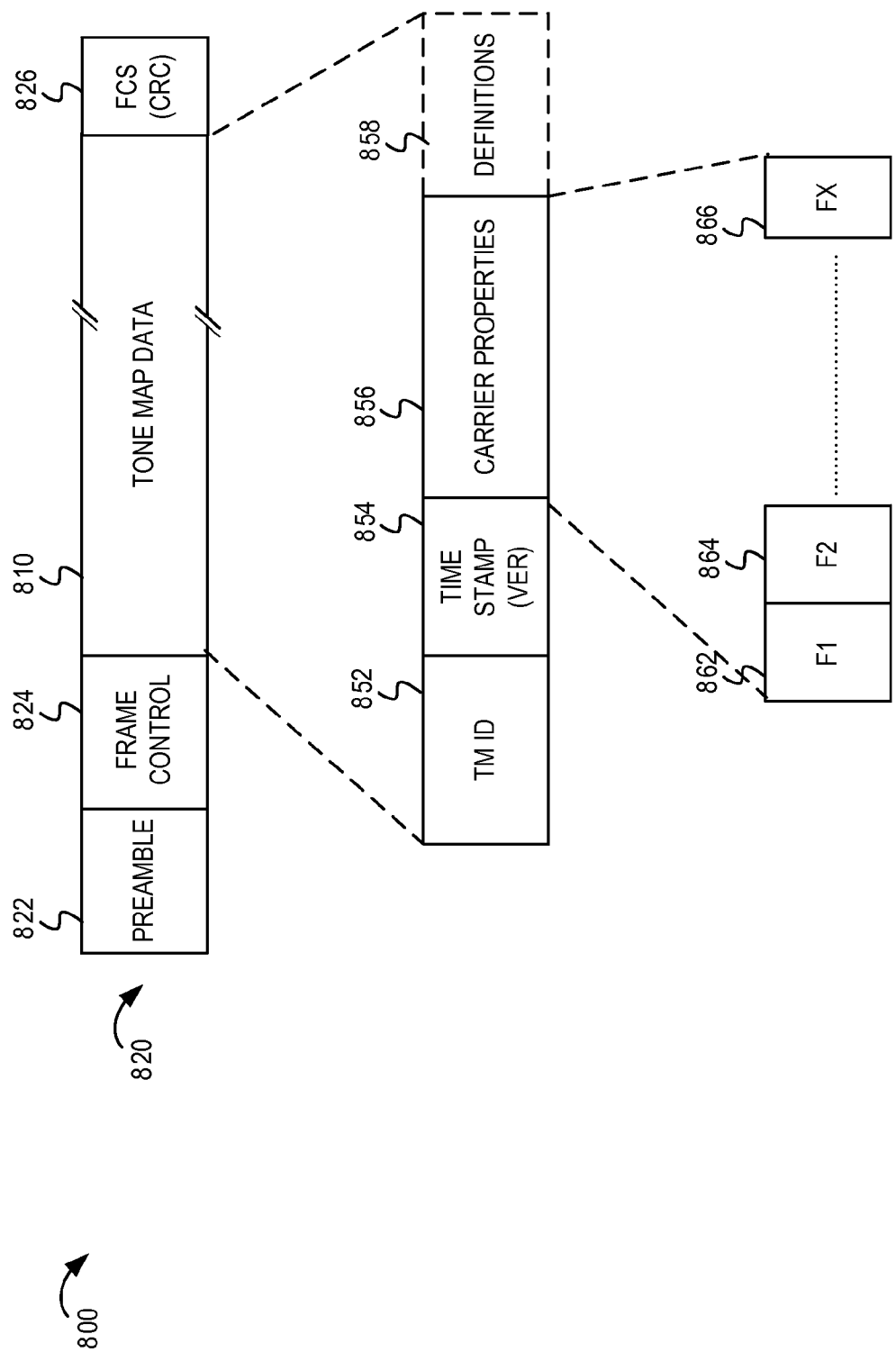
FIG. 8 is an example message format for a tone map message.

FIG. 8 is an example message format 800 for a tone map message. In some implementations, the tone map message is communicated in the form of a data unit or data packet. In some of these implementations, the data units may be transmitted over phone wire media, powerline cables or coaxial cables, for example, using a physical layer protocol as a Physical Layer Protocol Data Unit (PPDU), such as PPDU 820. The data units or packets may include a payload part with information to be delivered to a station and may include overhead information. The payload part may include, for example, application data and/or management information, (e.g., in some cases, in the form of a packet of a higher layer protocol). The overhead information may include information associated with encoding or modulation of information in the payload or with a communication protocol used by the stations in the network. The overhead information may include, for example, a preamble 822 used to detect the start of the data unit, a header 824 (also called a frame control field) after the preamble and before the payload 810, and a trailing frame check sequence 826 after the payload used to check the integrity of the transmission. As described in more detail below, in some cases, some or all of the overhead information can be included as part of the payload according to a given scheme for modulating the payload.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over powerline by the physical layer.

In one example message format 800, a payload 810 of the PPDU 820 is made up of tone map data. The tone map data may include a tone map identifier 852 and time stamp or version information 854 to distinguish the tone map data from a previous collection of tone map data. The tone map data includes the physical layer transmission properties 856 for each of a plurality of carriers $F_{1-X}$. For example, the physical layer transmission properties 856 may include a carrier field 862, 864, 866 for each of the carriers used in the communications channel. The carrier field may comprise a fixed bit length field of equal size for each carrier. The carrier field is used to indicate a Quadrature Amplitude Modulation (QAM) rate for a particular frequency used on the communications channel.

As described previously and well known to persons of skill in the relevant art, QAM conveys bit data by modulating the amplitudes of two carrier waves on the frequency. The two carrier waves, usually sinusoids, are out of phase with each other by 90 degrees, and are called quadrature components. Constellation points on a constellation diagram may be used to represent combinations of the quadrature components that represent different bits. For example, in 16-QAM modulation rate, there are 16 points in the constellation diagram. Each constellation point may be associated with a unique 4 bit value. Therefore, it may be said that 16-QAM is associated with sending 4 bits of data per symbol per carrier frequency. A 256-QAM modulation rate is associated with sending 8 bits per symbol per carrier frequency. A 1024-QAM modulation rate is associated with sending 10 bits per symbol per carrier frequency. A 4096-QAM modulation rate is associated with sending 12 bits per symbol per carrier frequency.

Rather than transmit the number of constellation points associated with a QAM modulation rate for each frequency, the carrier fields 862, 864, 866 may comprise a smaller value to represent the modulation rate. In an example, the tone map data (e.g., in payload 810), may include the symbol modulation rate (number of bits per symbol per carrier frequency) for each frequency. For example, if a tone is associated with 1024-QAM, the tone map may include the value "10" (also represented as hexadecimal value "A" or "0xA") for that tone. For a tone associated with 4096-QAM, the value "12" (or hexadecimal "0xC") is included for the tone. As such, for each tone in the tone map, four bits may be included to convey the symbol modulation rate for each tone. Four bits provides a range of 0 to 15 (or 0x0 to 0xF) of possible values that can be used to convey a symbol modulation rate for a particular frequency. In some example systems, the maximum symbol modulation rate is specified by a standards specification. For example, 4096-QAM may be the maximum allowed modulation rate on any frequency. Therefore, the value of 12 (0xC) may be the maximum value for a modulation rate of a frequency that would typically be included in a standards compliant tone map. The values 0-3 and 13-15 may be unused (or reserved) in the standard compliant tone map since they are not associated with a symbol modulation rate of a valid QAM modulation scheme supported by the standard specification.

In accordance with an embodiment of this disclosure, the tone map may be used to convey the symbol modulation rate and transmit power adjustment for a particular frequency. For example, a value included in the tone map for a frequency may represent a symbol modulation rate as well as a transmission power adjustment. For example, the tone map may include one of the reserved values to represent a combination of symbol modulation rate and transmission power adjustment. As an example, a value of 14 (or 0xE) may be a reserved value, since the example network system does not allow QAM-16384. In one embodiment, the value of 14 (0xE) may be defined to represent QAM-4096 with a transmission power adjustment of 80%.

Typically, if a frequency has high SNR at a lower modulation rate, then the receiver would increase the modulation rate for the frequency. However, once the maximum modulation rate (e.g. QAM 4096) has been reached, if receiver still detects high SNR, then the receiver may begin to use reserved values to indicate the maximum modulation rate (e.g. QAM 4096) with a decreased transmission power. As described above, the decreased transmission power may still be capable of reliably conveying data using the QAM 4096 modulation rate but decreasing the transmission power may improve the performance of other carriers in the communications channel.

For example, below is a listing of potential values for the carrier fields 862, 864, 866 based on one example with a 4-bit fixed length field for each particular carrier.

| Value (Hex) | Modulation and Power Level Information |
| --- | --- |
| 0x0 | Do not use carrier; 0% Power |
| 0x1 | BPSK; 100% Power |
| 0x2 | QPSK; 100% Power |
| 0x3 | 8-PSK; 100% Power |
| 0x4 | 16-QAM; 100% Power |
| 0x5 | 32-QAM; 100% Power |
| 0x6 | 64-QAM; 100% Power |
| 0x7 | 128-QAM; 100% Power |
| 0x8 | 256-QAM; 100% Power |
| 0x9 | 512-QAM; 100% Power |
| 0xA | 1024-QAM; 100% Power |
| 0xB | 2048-QAM; 100% Power |
| 0xC | 4096-QAM; 100% Power |
| 0xD | 4096-QAM; 90% Power |
| 0xE | 4096-QAM; 80% Power |
| 0xF | 4096-QAM; 70% Power |

In one embodiment, the various reserved values may be defined to represent combinations of symbol modulation rate and transmission power adjustments. The reserved values may be defined system-wide or on a per-transmitter basis. For example, the assignment of modulation mode and power level to a given tone map value may be unique for each transmitter-receiver pair in the network. While the use of reserved modulation modes is discussed, it may also be possible to use the existing modulation modes, where the receiver would indicate to the transmitter a power level adjustment using another portion of the tone map. Alternatively, custom tone map values may be configured between a transmitting device and receiving device during a configuration process so that the custom tone map values may be used in the subsequent tone map exchanged between the receiving device and transmitting device. Alternatively, a tone map value may be associated with an index value that represents an index in a lookup table having multiple combinations of symbol modulation rate and transmission power adjustments. In another alternative, the tone map may be extended to include a variable key portion used with custom tone map values to represent different combinations of symbol modulation rate and transmission power adjustments.

For example, a definitions field 858 may be included in the tone map data. Using the definitions field 858 any of the values used in the carrier fields 862, 864, 866 may be given a custom meaning. For example, one or more of the four bit values may be redefined to a specific modulation and power level adjustment. A key in the definitions field 858 may include the modulation and power level adjustment information associated with each custom value.

It should be understood that FIGS. 1-8 and the operations described herein are examples meant to aid in understanding embodiments and should not be used to limit embodiments or limit scope of the claims. Embodiments may perform additional operations, fewer operations, operations in a different order, operations in parallel, and some operations differently.

For example, while it is optimal for the receiving device to determine the transmission power adjustment, it may also be possible for the transmitting device to adjust the transmission power for particular frequencies. For example, the receiving device may provide the transmitting device with SNR measurements or other information about channel quality. The transmitting device may determine that a decrease in transmission power for a particular frequency may result in a lower but tolerable SNR for the particular frequency. For example, for a frequency that is configured to use the maximum symbol modulation rate (e.g. QAM 4096) allowed by the communications channel, the transmitting device may gradually decrease transmission power on that frequency. The transmitting device may determine whether decreasing transmission power on a particular frequency may improve the SNR of an adjacent or related other frequency. In the event that decreasing transmission power of a particular frequency results in poor performance, the receiving device may send an updated tone map lowering the modulation rate for that frequency. A transmitting device that had previously decreased power for the frequency may determine whether to use the lower modulation rate in the updated tone map or to revert to a previous transmission power used before the last gradual change.

In some implementations, other metrics (in addition to or in lieu of SNR) can be used to measure the effectiveness of the transmissions. For example, a packet success rate (PSR) metric may be used by a transmitting device to determine the quality of the communications channel. Typically, a transmitting node can reduce the transmit power to a particular node as long as the PSR is sufficiently high. However, maintaining the network connectivity is also of importance. To achieve this, in some implementations, the transmitting node may reduce the transmit power in steps, and for each reduced power level, check for the network connectivity by transmitting data to each node in the network and observing the PSR. In general, the transmitting node can reduce the transmit power as long as the network connectivity is maintained.

In some implementations, where a transmitting node sends data using any of the fixed tone maps, the receiver node can estimate a SNR margin available on each carrier frequency. In some implementations, the receiver node can provide feedback to the transmitter about the amount of power reduction possible. The transmitter can gather this information from all the nodes in the network and determine the power level to be used so that connectivity is maintained with all the nodes in the network.

In some implementations, such as in powerline networks, nodes periodically broadcast management packets (for example, beacon transmissions). A transmitting node can monitor these transmissions from each of the node in the network and estimate the amount of possible transmit power reduction to a particular destination node. The transmitting node can use these estimates and determine the level to which it can decrease the transmit power level such that network connectivity is maintained.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
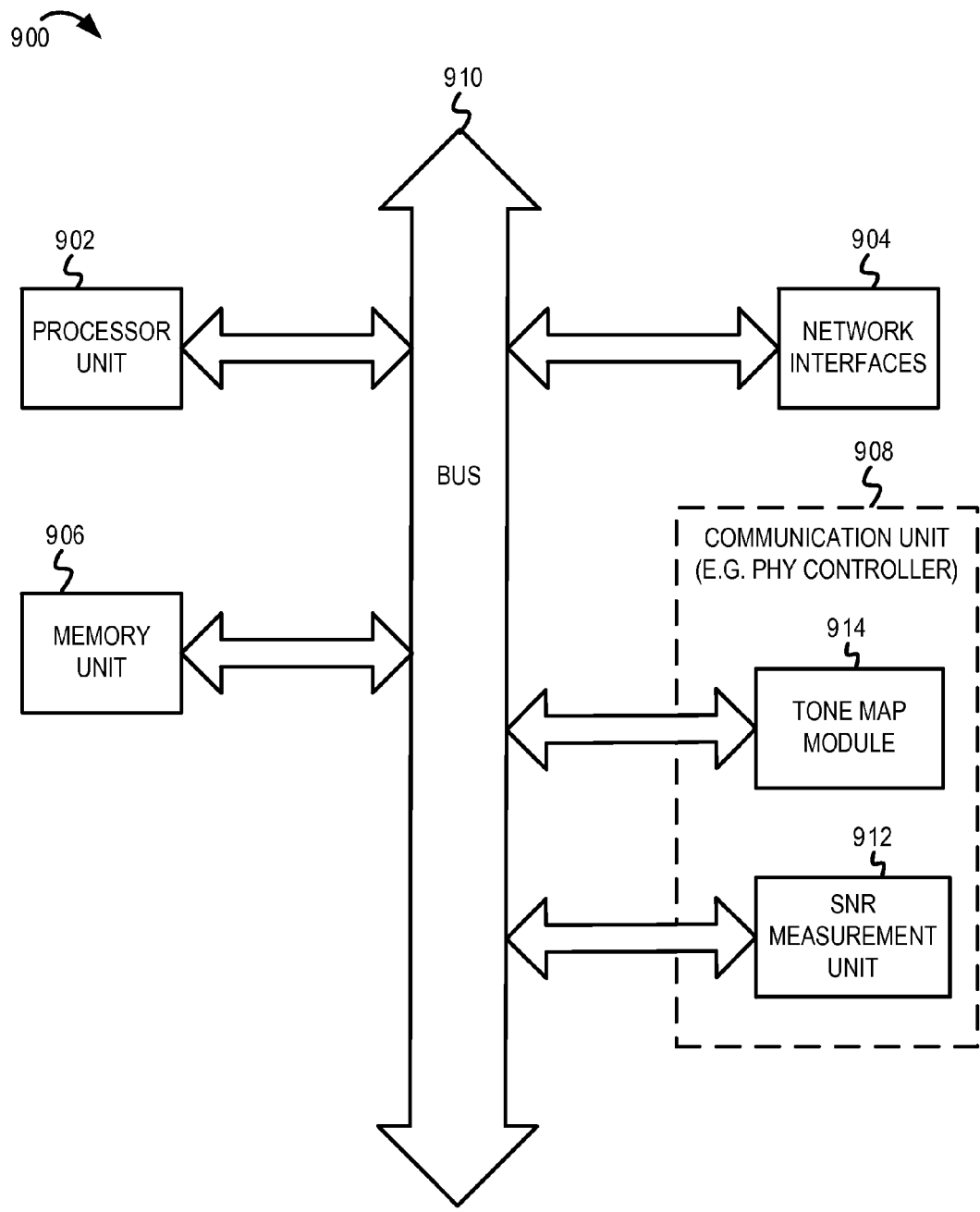
FIG. 9 is an example block diagram of one embodiment of an electronic device including a communication unit for adjusting physical layer transmission properties.

FIG. 9 is an example block diagram of one embodiment of an electronic device 900 including a communication unit for adjusting physical layer transmission properties. In some implementations, the electronic device 900 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 900 may include a processor unit 902 (possibly including multiple processors, multiple cores, multiple nodes, and/or implementing multi-threading, etc.). The electronic device 900 may include a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 may also include a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 900 may support multiple network interfaces—each of which is configured to couple the electronic device 900 to a different communication network.

The electronic device 900 may also include an SNR measurement unit 912 and a tone map module 914. As described above in FIGS. 1-8, the tone map module 914 may implement functionality to use a tone map having modulation and power level adjustment information on a per-carrier basis. The SNR measurement unit 912 may be used in coordination with the tone map module 914 such that the SNR measurement unit 912 provides SNR measurements and/or analysis of SNR measurements to the tone map module 914. The tone map module 914 may utilize SNR measurements in the preparation of the tone map in accordance with this disclosure.

In some embodiments, the SNR measurement unit 912 and tone map module 914 may be included as part of a communication unit 908. It should be understood, that in some embodiments, the communication unit 908 may also have a dedicated processor (e.g., such as a communication unit comprising a system on a chip, or board with multiple chips, or multiple boards, in which the communication may have one or more dedicated processor or processing unit(s), in addition to processor unit 902). Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, enhanced tone maps as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for coordinating communications via a communications channel between a first device and a second device, the method comprising:
preparing, at the first device, a tone map that includes modulation information and transmission power information for each of at least a first frequency and a second frequency;
defining a custom tone map value to represent a combination of modulation and transmission power;

using the custom tone map value in a carrier-specific field of the tone map;

transmitting a configuration message to the second device, wherein the configuration message defines the custom tone map value in association with the combination of the modulation and the transmission power; and transmitting the tone map to the second device.

2. The method of claim 1, further comprising:

measuring, at the first device, signal to noise ratio (SNR) measurements of transmissions from the second device; and determining the transmission power information for the first frequency based, at least in part, on the SNR measurements.

3. The method of claim 2, wherein said determining the transmission power information comprises:

maintaining a first performance associated with the first frequency at a lower transmission power for the first frequency, the lower transmission power lower than a previous transmission power, wherein the lower transmission power for the first frequency improves a second performance associated with the second frequency.

4. The method of claim 2, wherein the SNR measurements include at least a first SNR measurement associated with the first frequency and a second SNR measurement associated with the second frequency.

5. The method of claim 1, wherein the custom tone map value is not previously associated with a symbol modulation rate specified for the communications channel.

6. The method of claim 1, wherein the configuration message is transmitted prior to transmitting the tone map.

7. The method of claim 1, wherein the configuration message is included in a portion of the tone map.

8. The method of claim 1, wherein the custom tone map value represents an index to a lookup table having unique combinations of modulation and transmission power.

9. The method of claim 1, further comprising:

determining that a difference between a first signal to noise ratio (SNR) for the first frequency and a second SNR for the second frequency is higher than a threshold value; and setting the transmission power information for the first frequency to indicate a lower transmission power for one of the first frequency and the second frequency in response to said determining, the lower transmission power lower than a previous transmission power.

10. The method of claim 1, further comprising:

determining that a signal to noise ratio (SNR) for the first frequency is higher than a threshold value; and setting the transmission power information for the first frequency to a lower transmission power for the first frequency in response to said determining, the lower transmission power lower than a previous transmission power.

11. The method of claim 10, further comprising:

selecting a modulation rate for the first frequency prior to setting the transmission power information based, at least in part, on the SNR for the first frequency.

12. A first device, comprising:

a network interface for coupling the first device to a network having a communications channel between the first device and a second device;

a processor; and memory having instructions stored therein which, when executed by the processor, cause the first device to:

prepare a tone map that includes modulation information and transmission power information for each of at least a first frequency and a second frequency;

define a custom tone map value to represent a combination of modulation and transmission power, and use the custom tone map value in a carrier-specific field of the tone map;

transmit a configuration message to the second device, wherein the configuration message defines the custom tone map value in association with the combination of the modulation and the transmission power; and transmit the tone map to the second device via the network interface.

13. The first device of claim 12, wherein the instructions, when executed by the processor, cause the first device to measure, at the first device, signal to noise ratio (SNR) measurements of transmissions from the second device, and determine the transmission power information for the first frequency based, at least in part, on the SNR measurements.

14. The first device of claim 13, wherein the instructions, when executed by the processor, cause the first device to:

maintain a first performance associated with the first frequency at a lower transmission power for the first frequency, the lower transmission power lower than a previous transmission power, wherein the lower transmission power for the first frequency improves a second performance associated with the second frequency.

15. The first device of claim 13, wherein the SNR measurements include at least a first SNR measurement associated with the first frequency and a second SNR measurement associated with the second frequency.

16. The first device of claim 12, wherein the custom tone map value is not previously associated with a symbol modulation rate specified for the communications channel.

17. The first device of claim 12, wherein the configuration message is transmitted prior to transmitting the tone map.

18. The first device of claim 12, wherein the configuration message is included in a portion of the tone map.

19. A non-transitory computer readable medium storing computer program code, the computer program code comprising instructions which when executed by a processor causes the processor to:

prepare a tone map for a communications channel between a first device and a second device, wherein the tone map includes modulation information and transmission power information for each of at least a first frequency and a second frequency;

define a custom tone map value to represent a combination of modulation and transmission power;

use the custom tone map value in a carrier-specific field of the tone map;

transmit a configuration message to the second device, wherein the configuration message defines the custom tone map value in association with the combination of the modulation and the transmission power; and transmit the tone map to the second device.

20. The non-transitory computer readable medium of claim 19, wherein the computer program code further comprises instructions to:

maintain a first performance associated with the first frequency at a lower transmission power for the first frequency, the lower transmission power lower than a previous transmission power, wherein the lower transmission power improves a second performance associated with the second frequency.

21. The non-transitory computer readable medium of claim 19, wherein the computer program code further comprises instructions to:
   measure, at the first device, signal to noise ratio (SNR) measurements of transmissions from the second device; and
   determine the transmission power information for the first frequency based, at least in part, on the SNR measurements.

22. The non-transitory computer readable medium of claim 21, wherein the SNR measurements include at least a first SNR measurement associated with the first frequency and a second SNR measurement associated with the second frequency.

23. The non-transitory computer readable medium of claim 19, wherein the custom tone map value is not previously associated with a symbol modulation rate specified for the communications channel.

\* \* \* \* \*